US008660359B2

(12) United States Patent
Conger

(10) Patent No.: US 8,660,359 B2
(45) Date of Patent: Feb. 25, 2014

(54) ESTIMATING ATMOSPHERIC PARAMETERS AND REDUCING NOISE FOR MULTISPECTRAL IMAGING

(75) Inventor: James Lynn Conger, San Ramon, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 209 days.

(21) Appl. No.: 13/365,198

(22) Filed: Feb. 2, 2012

(65) Prior Publication Data
US 2013/0272614 A1    Oct. 17, 2013

Related U.S. Application Data

(60) Provisional application No. 61/528,731, filed on Aug. 29, 2011.

(51) Int. Cl.
*G06K 9/46*    (2006.01)
(52) U.S. Cl.
USPC .......................................................... 382/191
(58) Field of Classification Search
None
See application file for complete search history.

(56) References Cited

U.S. PATENT DOCUMENTS

2005/0151965 A1* 7/2005 Bissett et al. ................. 356/328
2011/0249894 A1* 10/2011 Meany ........................... 382/166

OTHER PUBLICATIONS

Estimation of Sea Surface Temperature from Space. D. Anding and R. Kauth. 1970.*
Autonomous Atmospheric Compensation (AAC) of High Resolution Hyperspectral Thermal Infrared Remote-Sensing Imagery. Degui Du, Alan Gillespie, Anne Kahle, and Frank Palluconi. 2000.*
Abel, M.D. et al., "New Approach to Atmospheric Correction of Hyperspectral Data," *Proc. of SPIE* 4725:72-82, 2002.
Achard, V. and S. Lesage, "Atmospheric Correction of Airborne Infrared Hyperspectral Images Using Neural Networks," *IEEE*, 4 pages, 2010.
Ahlberg, Jürgen, "Estimating Atmosphere Parameters in Hyperspectral Data," *Proc. of SPIE* 7695:76952A1-76952A8, 2010.
Bernhardt, M. and W. Oxford, "Atmospheric Invariants for Hyperspectral Image Correction," *Proc. of SPIE* 6966:69661A-1-69661A-8, 2008.
Burr, Tom and N. Hengartner, "Overview of Physical Models and Statistical Approaches for Weak Gaseous Plume Detection Using Passive Infrared Hyperspectral Imagery," *Sensors* 6:1721-1750, 2006.
Gu, D. et al., "Autonomous Atmospheric Compensation (AAC) of High Resolution Hyperspectral Thermal Infrared Remote-Sensing Imagery," *IEEE Transactions on Geoscience and Remote Sensing* 38(6):2557-2570, 2000.
Winter, Edwin M., "Endmember-Based In-Scene Atmospheric Retrieval (EMISAR)," *IEEE Aerospace Conference Proceedings* 1812-1817, 2004.

* cited by examiner

*Primary Examiner* — Stephen R Koziol
*Assistant Examiner* — Delomia Gilliard
(74) *Attorney, Agent, or Firm* — Perkins Coie

(57) ABSTRACT

A method and system for estimating atmospheric radiance and transmittance. An atmospheric estimation system is divided into a first phase and a second phase. The first phase inputs an observed multispectral image and an initial estimate of the atmospheric radiance and transmittance for each spectral band and calculates the atmospheric radiance and transmittance for each spectral band, which can be used to generate a "corrected" multispectral image that is an estimate of the surface multispectral image. The second phase inputs the observed multispectral image and the surface multispectral image that was generated by the first phase and removes noise from the surface multispectral image by smoothing out change in average deviations of temperatures.

20 Claims, 15 Drawing Sheets

ESTIMATING ATMOSPHERIC PARAMETERS AND REDUCING NOISE FOR MULTISPECTRAL IMAGING

CROSS-REFERENCE TO RELATED APPLICATIONS

This application claims the benefit of U.S. Provisional Application No. 61/528,731 filed Aug. 29, 2011 which is incorporated herein by reference in its entirety.

STATEMENT REGARDING FEDERALLY SPONSORED RESEARCH

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND

A multispectral image stores an intensity vector for each pixel of the image. The intensity vector has an intensity value representing radiance for each frequency for each spectral band in a spectrum. A multispectral image may be captured by a multispectral instrument that has a slit for receiving a certain number of pixels across the instrument and that is moved over an area to be imaged. For example, a multispectral image of a land area may be collected by a multispectral instrument that is mounted on an airplane that flies over the land area in a direction perpendicular to the slit. Such an instrument may include a prism that splits the electromagnetic wave for each pixel into intensity values that represent different frequencies. FIG. 1 illustrates the data representing a multispectral image. The x-axis represents the direction across the instrument, the y-axis represents the direction of travel, and the z-axis represents the intensity vectors. The term "hyperspectral" is generally used to refer to a multispectral image that has more than 100 spectral bands, and some of them can even have more than 256 spectral bands. Because of the large number of spectral bands for each pixel, hyperspectral data "cubes" contain vast amounts of data that require considerable storage and processing resources. Alternatively, a multispectral instrument can be constructed using a Fourier transform spectrometer that creates the same data type via repeated exposures of the same scene with slightly different optical path lengths. The resultant data can be considered identical in format to that shown in FIG. 1.

A multispectral instrument typically works in the long-wavelength infrared ("LWIR") region, such as the of 8-13 micron wavelength region. Waves in the LWIR region are relatively transmissive in the atmosphere, but can be absorbed by water vapor and other trace gases with increasing absorption in humid conditions and with longer path lengths through the atmosphere. As a result of this absorption, the radiance detected by a multispectral instrument, referred to as "observed radiance" is less than the radiance at the surface, referred to as "surface radiance." A measure of this absorption is called "atmospheric transmittance" or "transmittance," which represents the fraction of surface radiance that is not absorbed by the atmosphere. The observed radiance is also impacted by the emission of photons from the atmosphere itself, referred to as "atmospheric radiance," which tends to increase the observed radiance. FIG. 2 is a diagram of the relationship between observed radiance $R_o$, surface radiance $R_s$, atmospheric radiance $R_a$, and transmittance $\tau$, as represented by the following equation:

$$R_o = (R_s * \tau) + R_a \quad (1)$$

where the downwelling radiance is assumed to be zero (i.e., exhibits "black body behavior"). Many surfaces, including most vegetation, are nearly completely non-reflective in the LWIR region. As such, the effect of downwelling radiance on the observed radiance in this range is near zero.

As shown by Equation 1, to calculate the surface radiance from the observed radiance both the atmospheric radiance and transmittance are needed. Two general approaches to solving this problem that tools have used to estimate atmospheric radiance and transmittance are modeling and in-scene estimation. Modeling tools, such as the Moderate Resolution Atmospheric Transmission ("MODTRAN5") program, rely on explicit models of the atmosphere with contributions from every gas and each temperature/pressure level of the atmospheric gases. Because the atmosphere varies enormously over time and location, it can be difficult and time consuming to build an accurate model. Such modeling tools are typically only useful to give first approximations without extensive iterations, which are computationally expensive. In-scene estimation tools, such as the In-scene Atmospheric Compensation ("ISAC") program, measure the relative atmospheric transmission and absorption for all the multispectral bands based on the observation that most LWIR scenes contain a majority of objects that are near black body in behavior. Such in-scene estimation tools generally produce reasonable first estimates for atmospheric radiance and transmission that are not accurate enough to allow atmospheric artifacts to be deciphered from the observed radiance. Although modeling and in-scene estimation tools produce reasonable starting points for estimating atmospheric radiance and transmittance, the resulting surface radiance that is calculated based on those estimates has a substantial amount of noise.

DETAILED DESCRIPTION

Figure 1:
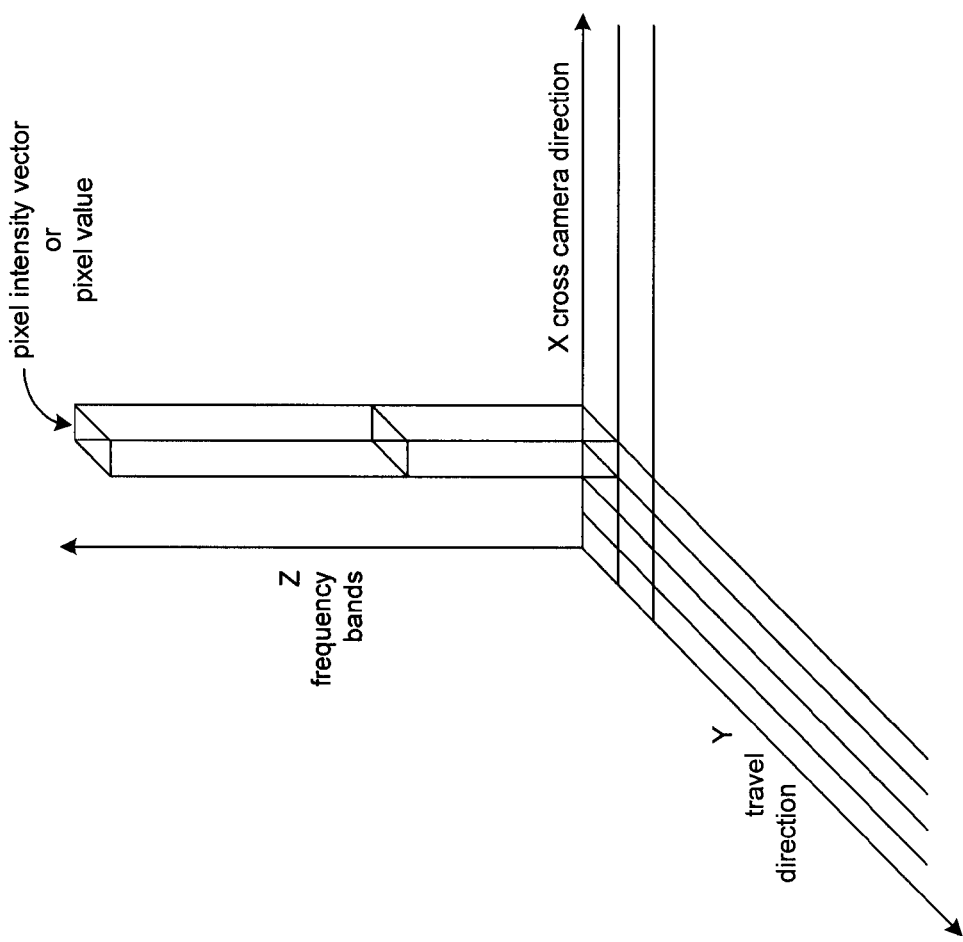
FIG. 1 illustrates the data representing a multispectral image.
Figure 2:
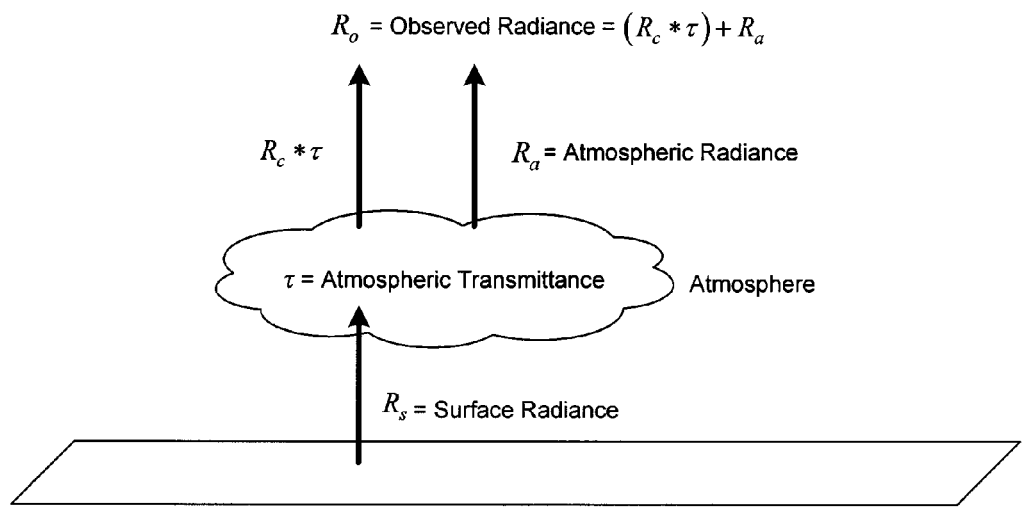
FIG. 2 is a diagram of the relationship between observed radiance, surface radiance, atmospheric radiance, and transmittance.

A method and system for estimating atmospheric radiance and transmittance is provided. In some embodiments, an atmospheric estimation system is divided into a first phase and a second phase. The first phase inputs an observed multispectral image and an initial estimate of the atmospheric radiance and transmittance for each spectral band and calculates the atmospheric radiance and transmittance for each spectral band, which can be used to generate a "corrected" multispectral image that is an estimate of the surface multispectral image. The first phase identifies pixels of the multispectral image that tend to exhibit black body behavior, meaning those that have a near constant temperature across all spectral bands. The first phase calculates the temperature for a pixel at a band using Planck's equation. To determine the atmospheric radiance and transmittance for a band, the first phase selects a pair of pixels that exhibit black body behavior and that have different temperatures at that band. The first phase calculates the black body radiance for those pixels using Equation 1 and the observed radiance of those pixels and then the initial estimates for the atmospheric radiance and transmittance. The first phase then calculates the atmospheric radiance and transmittance using Equation 1 by using two equations with two unknowns. The first phase may then estimate the surface radiance for each pixel at each band of the multispectral image using the calculated atmospheric radiance and transmittance of each band to generate the surface multispectral image.

The second phase inputs the observed multispectral image and the surface multispectral image that was generated by the first phase and removes noise from the surface multispectral image. The second phase processes the multispectral image on a band-by-band basis. For each band, the second phase determines the deviation between the surface radiance of each pixel and its neighboring pixels. For example, the deviation for a pixel may be the surface radiance of that pixel minus the average surface radiance of its neighboring pixels. The second phase then calculates the average of these deviations for pixels with the same temperature (e.g., in 0.1° ranges). When the average deviation versus temperature is graphed for a band, a graph with a positive slope indicates that the surface radiance of all the pixels tends to be above the surface radiance of their neighboring pixels. The second phase then smooths out the change in average deviation for the temperatures. The second phase may use a linear curve fitting technique to perform the smoothing of the graph of average deviation versus temperature. The second phase then selects two pixels and adjusts their surface radiance by using the smoothed out average deviations for the temperature of those pixels. For example, one selected pixel A may have a temperature of 40° with a smoothed out average deviation of 0.05 microns, and the other selected pixel B may have a temperature of 45° with a smoothed out average deviation of 0.1 micron. In such a case, the second phase subtracts 0.05 microns from the surface radiance of pixel A and subtracts 0.1 micron from the surface radiance of pixel B. With the surface radiance of these two pixels, the second phase then recalculates the atmospheric radiance and transmittance using Equation 1 using two equations with two unknowns. The second phase then recalculates the surface radiance of the pixels of each band using the recalculated atmospheric radiance and transmittance of each band to regenerate the surface multispectral image. The second phase may be performed iteratively until a termination criterion is satisfied such as when a certain number of iterations have been completed or the atmospheric radiance and transmittance for the bands converge on a solution.

Although the atmospheric estimation system employs both a first phase and a second phase, each phase may be used in a system that does not employ the other phase. The first phase may be used by itself to provide reasonable estimates for the surface radiance, atmospheric radiance, and transmittance. The second phase may be used to remove the noise of surface radiance that was calculated by a system other than the one used in the first phase, such as MODTRANS or ISAC.

Figure 3:
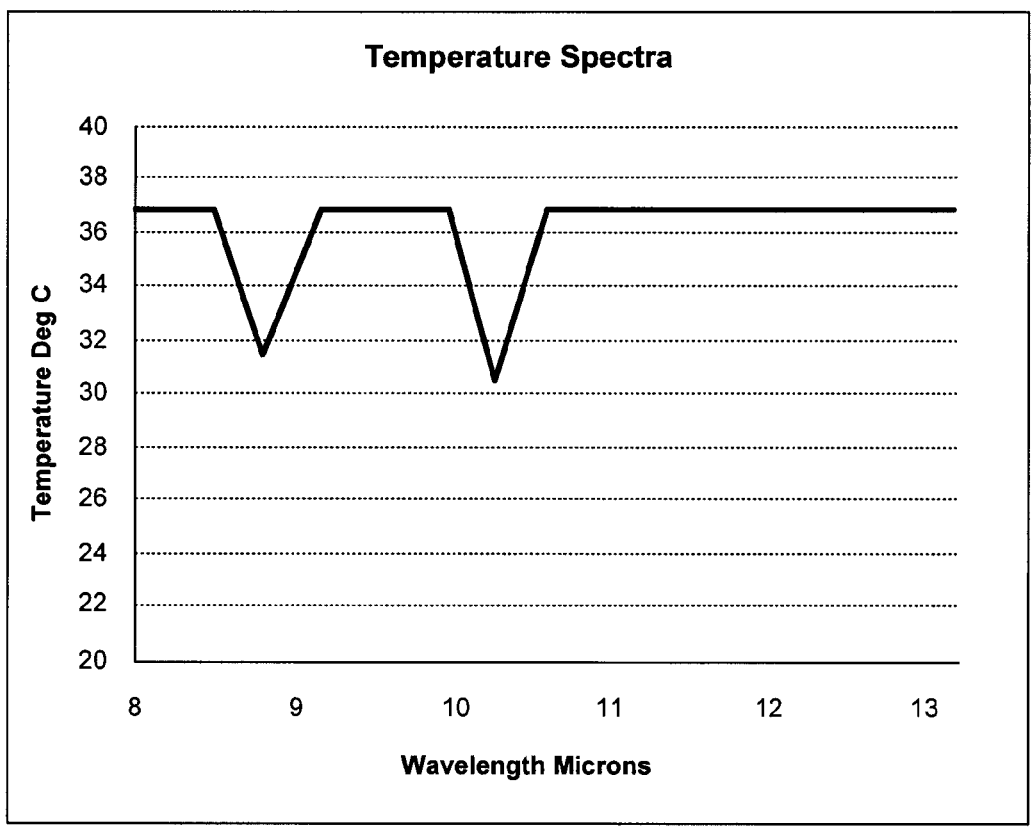
FIG. 3 illustrates a graph of temperature versus band wavelength.

In some embodiments, the first phase of the atmospheric estimation system calculates the temperature of the pixels at each band based on the initial estimates of the atmosphere parameters (i.e., atmospheric radiance and transmittance), calculates a metric indicating how well each pixel exhibits black body behavior based on the temperatures of the pixels, and calculates the atmospheric parameters for each band using the observed radiance for a pair of pixels with different temperatures that exhibit near black body behavior. The first phase may be provided with the initial estimates of the atmosphere parameters. For example, the initial estimates of the atmospheric parameters may be derived from the observed multispectral image using a modeling tool or an in-scene estimation tool. The first phase then identifies some pixels of the multispectral image that exhibit near black body behavior based on an analysis of the observed radiances of the pixels and the initial estimates of the atmospheric parameters. The first phase deems that a pixel is exhibiting black body behavior based on an analysis of that pixel in the temperature domain. In the temperature domain, a pixel exhibiting black body behavior will tend to have a constant temperature across all bands. FIG. 3 illustrates a graph of temperature versus band wavelength. On this graph, a horizontal line represents a pixel exhibiting pure black body behavior. In this example, the line has a deviation from the horizontal near 8.9 microns and near 10.3 microns. The first phase may calculate the temperature according to the following equations:

$$R_o = (R_b * \tau) + R_a \quad (2)$$

$$R_b = \frac{(R_o - R_a)}{\tau} \quad (3)$$

$$T = \frac{14388}{\lambda * \ln\left(\frac{1.1909^{10}}{\lambda^5 R_b} + 1\right)} \quad (4)$$

where T represents temperature (K) for a pixel at a band, $R_o$ represents the observed radiance of the pixel at the band, $R_b$ represents the black body radiance of the pixel at the band, $R_a$ represents the initial estimate of atmospheric radiance, τ represent the initial estimate of transmittance, and λ represents the wavelength in microns of the band. Equation 4 calculates the Planck black body temperature of the radiance $R_b$. The first phase calculates the standard deviation of the temperature for the bands of that pixel across all measured wavelengths, or it may use some other metric to measure the deviation in temperature of a pixel.

Figure 4:
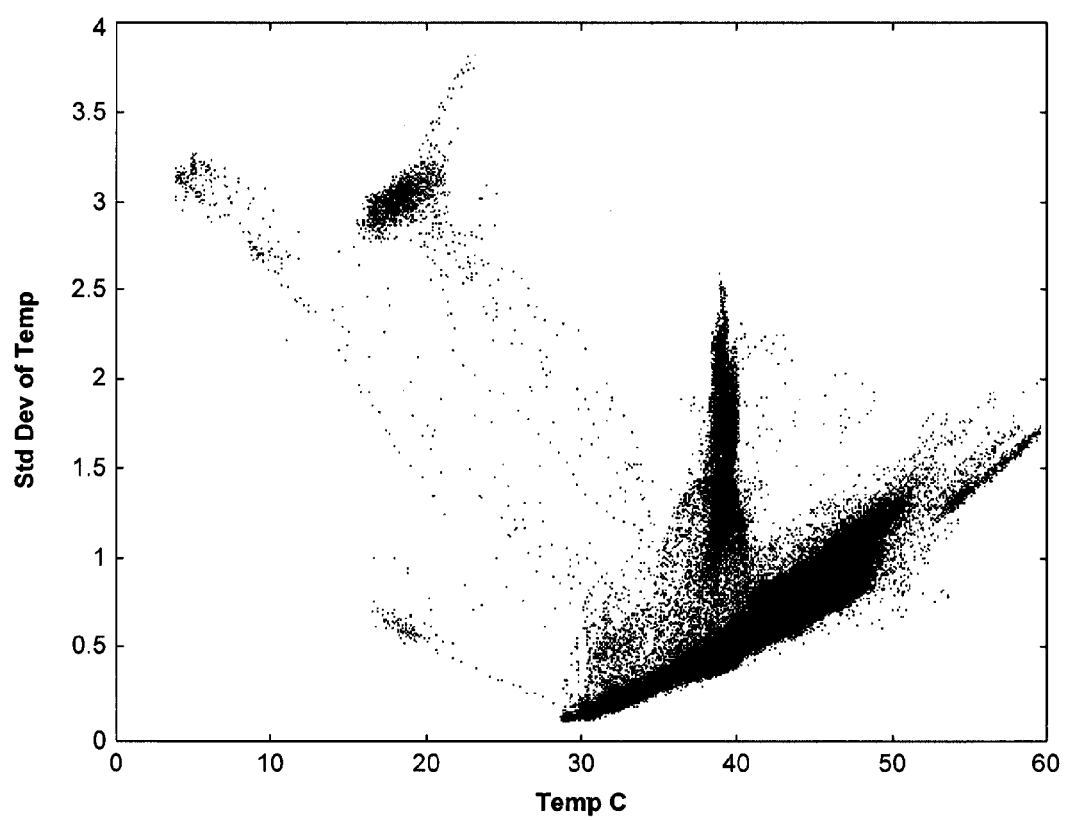
FIG. 4 illustrates an example graph of standard deviation versus average temperature for the pixels of a multispectral image.

After the standard deviation in temperature for each pixel is calculated, the first phase identifies a pair of pixels that have different average temperatures and with a low standard deviation when compared to other pixels with that average temperature. The second phase may calculate the average temperature for a pixel by averaging the temperature for the bands that are in the most transmissive region of the spectrum, which in the case of LWIR is generally around 10 microns. FIG. 4 illustrates an example graph of standard deviation versus average temperature for the pixels of a multispectral image. To identify the pair of pixels, the first phase may calculate the mean (e.g., 40°) of the average temperatures. The first phase then selects a low temperature (e.g., 37.5°) that is below the mean and a high temperature (e.g., 42.5°) that is above the mean. The first phase then selects a pair of pixels where one pixel has the lowest standard deviation of the pixels with the low temperature and the other pixel has the lowest standard deviation of the pixels with the high temperature. One skilled in the art will appreciate that many different techniques may be used to select a pair of pixels with different temperatures and a relatively low standard deviation when compared to other pixels at that temperature. After identifying the pair of pixels, the first phase calculates an atmospheric radiance and transmittance for each band using the observed radiance as of the pixels. Equation 1 has two variables $R_a$ and $\tau$. With a pair of pixels, the first phase can solve for the variables because there are two equations with two unknowns as represented by the following.

$$R'_o = (R'_b * \tau) + R_a \quad (5)$$

$$R''_o = (R'_b * \tau) + R_a \quad (6)$$

$$R'_o - R''_o = (R'_b * \tau) - (R''_b * \tau) \quad (7)$$

$$R'_o - R''_o = (R'_b - R''_b) * \tau \quad (8)$$

$$\tau = \frac{(R'_o - R''_o)}{(R'_b - R''_b)} \quad (9)$$

$$R_a = R_o - (R'_b * \tau) \quad (10)$$

where $R'_o$ and $R''_o$ represent the observed radiances of the pair of pixels for a band. In some embodiments, the first phase may identify multiple pairs of pixels to average the results over the pairs of pixels to reduce the impact of noise on the calculated atmospheric radiance and transmittance. The first phase then calculates the surface radiance for each pixel at each band to generate the surface multispectral image using the following equation:

$$R_c = \frac{(R_o - R_a)}{\tau} \quad (11)$$

Figure 5:
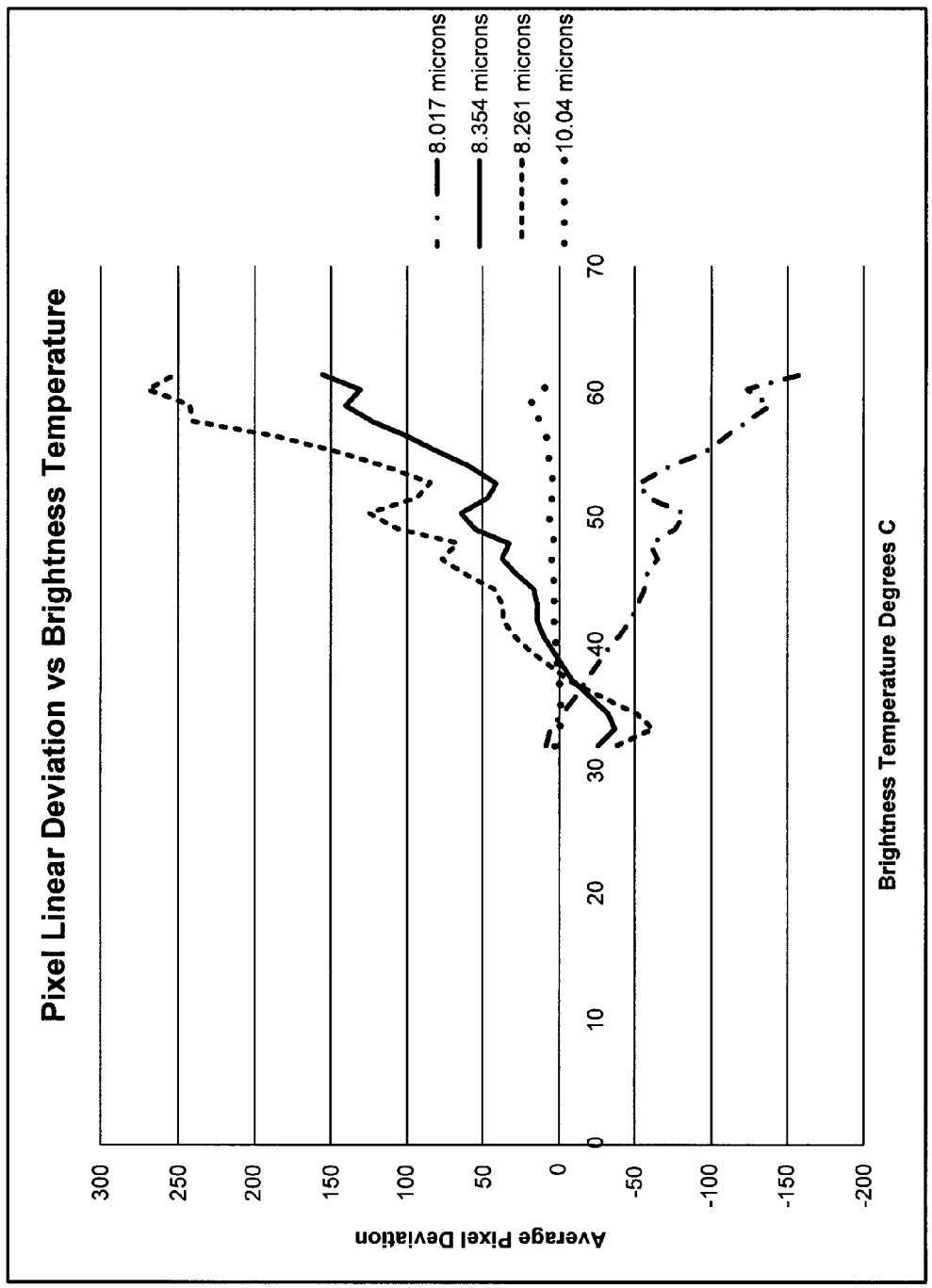
FIG. 5 illustrates graphs of average deviation versus temperature for various bands.

In some embodiments, the second phase, for each band, smoothes the deviation versus temperature graphs, adjusts the surface radiance of a pair of pixels based on the smoothed deviation, recalculates the atmospheric parameters using the adjusted radiances, and recalculates the surface multispectral image. For each band, the second phase performs the following processes. The second phase initially determines the linear deviation between the surface radiance at the band for a center pixel and its neighboring pixels in the spectral dimension. The second pass may calculate the average surface radiance of these pixels and subtract that average from the surface radiance of the center pixel to give the deviation. The second phase calculates the average deviation for each temperature of the pixels that have that temperature. FIG. 5 illustrates graphs of average deviation versus temperature for various bands. A graph with a positive slope indicates that the transmittance is too high, and a graph with a negative slope indicates that the transmittance is too low. The second phase then smoothes out the average deviations for each band by applying a linear curve fitting algorithm to the graph of each band. The second phase then identifies a pair of pixels with different temperatures and adjusts their surface radiance by the smoothed out average deviations for pixels that have the same temperature. With the adjusted surface radiance for these pixels, the second pass recalculates the atmospheric radiance and transmittance for each band using the following equations.

$$R'_c = \frac{R'_o - R_a}{\tau} \quad (12)$$

$$R''_c = \frac{R''_o - R_a}{\tau} \quad (13)$$

$$\tau = \frac{R'_o - R_a}{R'_c} \quad (14)$$

$$\tau = \frac{R''_o - R_a}{R''_c} \quad (15)$$

$$\frac{R'_o - R_a}{R'_c} = \frac{R''_o - R_a}{R''_c} \quad (16)$$

$$R_a = \frac{R''_c R'_o - R'_c R''_o}{R''_c - R'_c} \quad (17)$$

$$\tau = \frac{R'_o - R_a}{R'_c} \quad (18)$$

where $R'_c$ and $R''_c$ represent the adjusted surface radiance of the pair of pixels. The second phase then recalculates the surface radiance for each pixel. After completing this process for each band, the second phase may perform the entire process iteratively until a termination criterion is satisfied.

Figure 6:
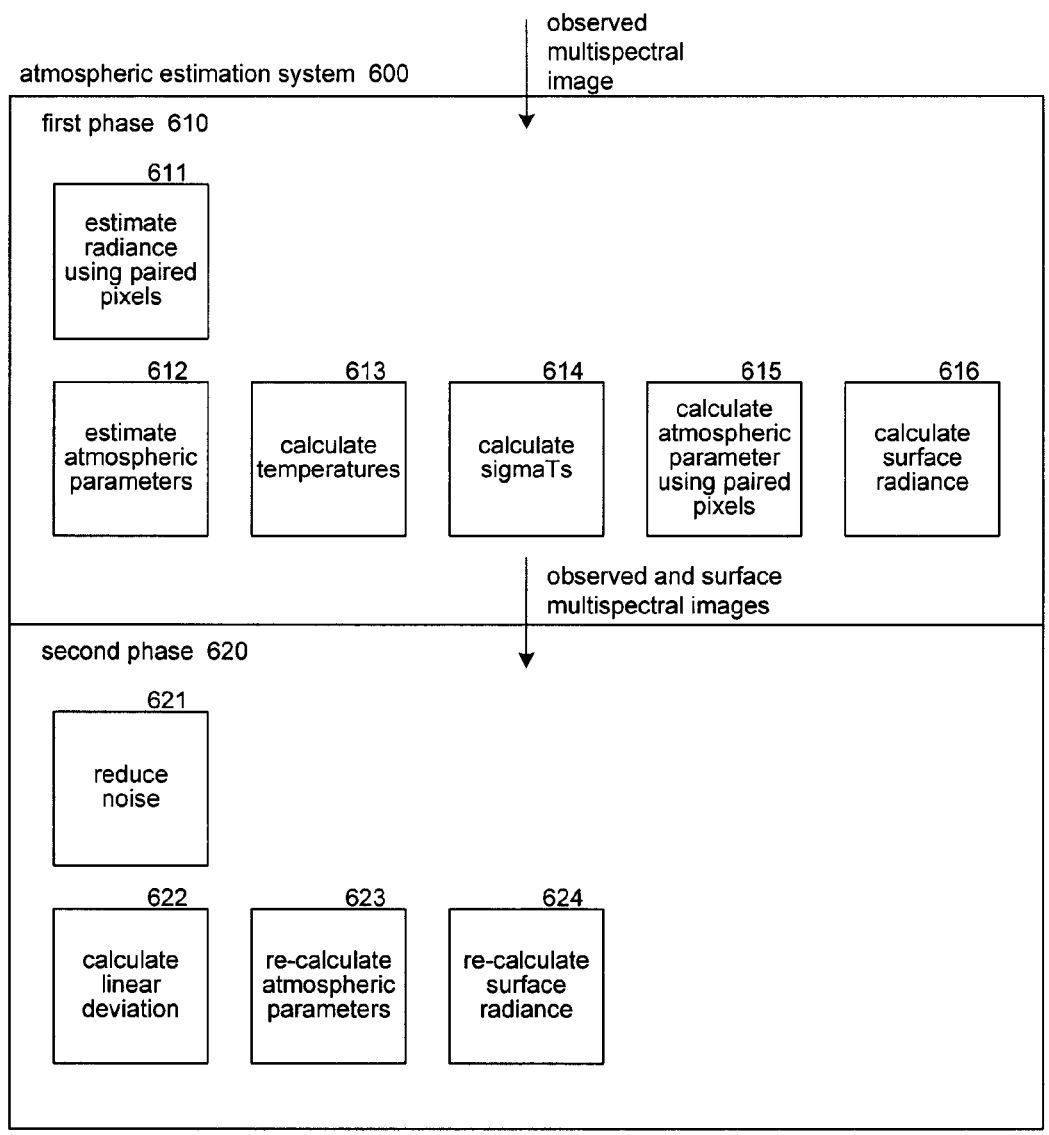
FIG. 6 is a block diagram illustrating components of the atmospheric estimation system in some embodiments.

FIG. 6 is a block diagram illustrating components of an atmospheric estimation system 600 in some embodiments. The atmospheric estimation system 600 includes a first phase component 610 and a second phase component 620. The phase one component inputs an observed multispectral image and outputs a surface multispectral image. The first phase component includes an estimate radiance using paired pixels component 611, an estimate atmospheric parameters component 612, a calculate temperatures component 613, a calculate sigmaT component 614, a calculate atmospheric parameters component 615, and a calculate surface radiance component 616. The estimate radiance using paired pixels component controls the overall processing of the first phase. The estimate atmospheric parameters component provides an estimate of the atmospheric radiance and transmittance for each band. The calculate temperatures component calculates the temperatures of each pixel of each band based on the observed radiance of the pixels. The calculate sigmaT component calculates, for each pixel, the standard deviation of the temperatures of the bands at that pixel. The calculate atmospheric parameters component calculates the atmospheric radiance and transmittance for each band. The calculate surface radiance component calculates a surface radiance for each band of each pixel using the calculated atmospheric radiance and transmittance.

The second phase component includes a reduce noise component 621, a calculate linear deviation component 622, a recalculate atmospheric parameters component 623, and a recalculate surface radiance component 624. The reduce noise component controls the overall processing of the second phase by iteratively invoking the other components for each band and until a termination condition is satisfied. The calculate linear deviation component calculates the average linear deviation at each wavelength for the pixels of a band. The recalculate atmospheric parameters component recalculates the atmospheric radiance and transmittance for a band based on a smoothing of the average deviations at different wavelengths. The recalculate surface radiance component recalculates the surface radiance for pixels of a band based on the recalculated atmospheric radiance and transmittance for that band.

The computing devices on which the atmospheric estimation system may be implemented may include a central processing unit and memory and may include input devices (e.g., keyboard and pointing devices), output devices (e.g., display devices), and storage devices (e.g., disk drives). Computer-readable media include computer-readable storage media and data transmission media. The computer-readable storage media include memory and other storage devices that may have recorded upon or may be encoded with computer-executable instructions or logic that implement the atmospheric estimation system. The data transmission media transmits data using signals or carrier waves (e.g., electromagnetism) via a wire or wireless connection. Various functions of the atmospheric estimation system may also be implemented on devices using discrete logic or logic embedded as an application-specific integrated circuit. The atmospheric estimation system may be implemented on a computing device that is local to a vehicle that collects multispectral images.

The atmospheric estimation system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 7:
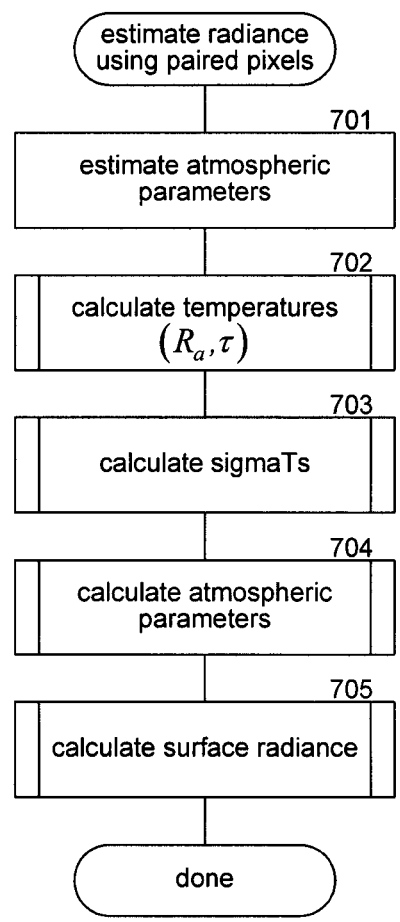
FIG. 7 is a flow diagram that illustrates the processing of an estimate radiance using paired pixels component of the first phase in some embodiments.

FIG. 7 is a flow diagram that illustrates the processing of the estimate radiance using paired pixels component of the first phase in some embodiments. The component is provided with observed multispectral image. In block 701, the component generates or is provided with initial estimates of the atmospheric radiance and transmittance for each band. In block 702, the component invokes the calculate temperatures component by passing it the estimated atmospheric radiance and transmittance. In block 703, the component invokes the calculate sigmaT component to calculate the standard deviation of temperatures for each pixel. In block 704, the component invokes the calculate atmospheric parameters component to calculate the atmospheric radiance and transmittance for each band. In block 705, the component invokes the calculate surface radiance component to calculate the surface radiance for each pixel at each band based on the calculated atmospheric radiance and transmittance. The component then completes.

Figure 8:
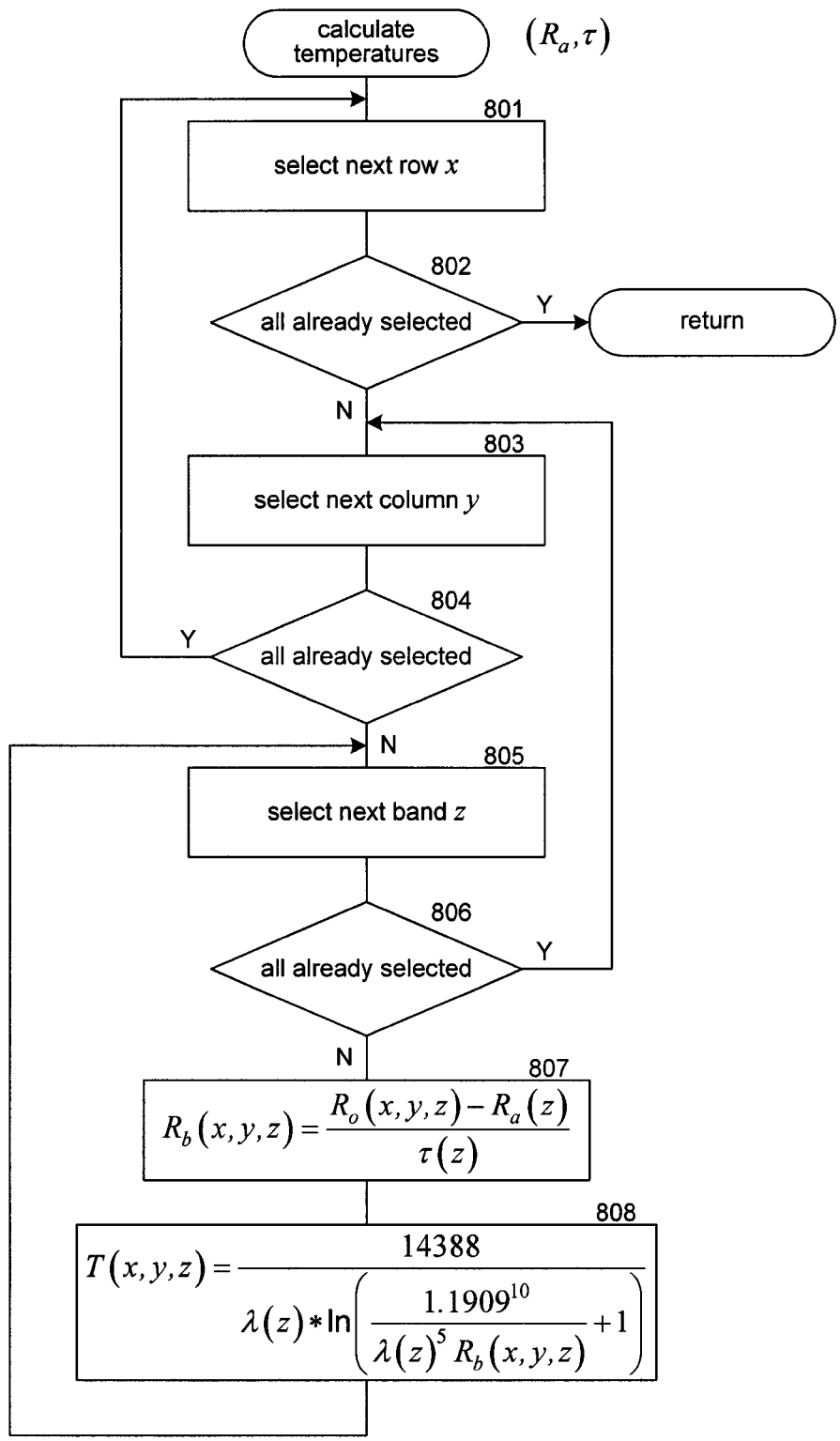
FIG. 8 is a flow diagram that illustrates the processing of a calculate temperatures component of the first phase in some embodiments.

FIG. 8 is a flow diagram that illustrates the processing of the calculate temperatures component of the first phase in some embodiments. The component is passed an estimated atmospheric radiance and transmittance for each band. In blocks 801-809, the component loops, selecting each band of each pixel and calculating the black body radiance and temperature for that band of that pixel. In block 801, the component selects the next row of the image. In decision block 802, if all the rows have already been selected, then all the pixels have been processed and the component returns, else the component continues at block 803. In block 803, the component selects the next column of the image in order to select the pixel of the selected row and column. In decision block 804, if all the columns have already been selected, then all the pixels of the selected row have been processed and the component loops to block 801 to select the next row, else the component continues at block 805. In block 805, the component selects the next band for the selected pixel. In decision block 806, if all the bands have already been selected, then the component loops to block 803 to select the next pixel in the next column, else the component continues at block 807. In block 807, the component calculates the black body radiance for the selected pixel. In block 808, the component calculates the temperature for the selected pixel at the selected band and then loops to block 805 to select the next band.

Figure 9:
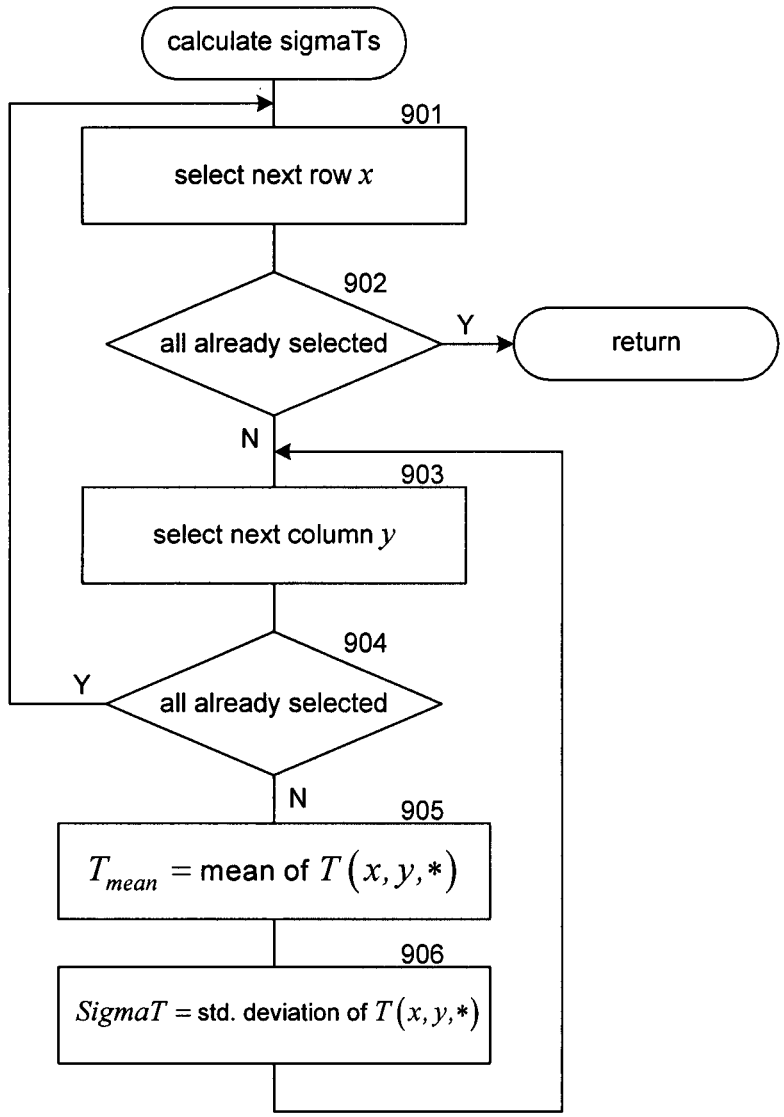
FIG. 9 is a flow diagram that illustrates the processing of a calculate sigmaT component of the first phase in some embodiments.

FIG. 9 is a flow diagram that illustrates the processing of the calculate sigmaT component of the first phase in some embodiments. In block 901, the component selects the next row of the multispectral image. In decision block 902, if all the rows have already been selected, then all the pixels have been processed and the component returns, else the component continues at block 903. In block 903, the component selects the next column of the image in order to select the next pixel. In decision block 904, if all the columns have already been selected for the selected row, then the component loops to block 901 to select the next row, else the component continues at block 905. In block 905, the component calculates the mean of the temperatures for the selected pixel across all bands. In block 906, the component calculates the standard deviation of the temperature for the selected pixel in the spectral dimension and then loops to block 903 to select the next pixel.

Figure 10:
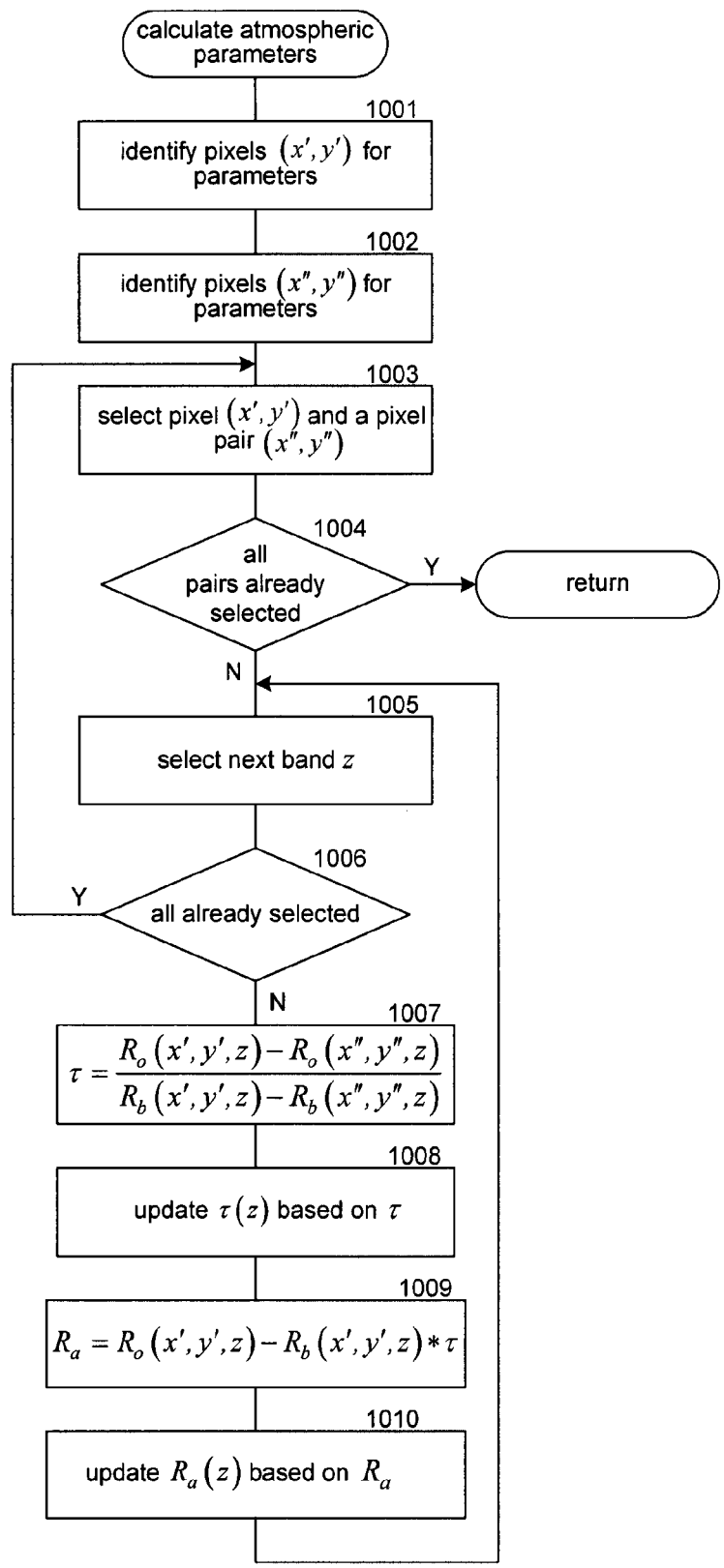
FIG. 10 is a flow diagram that illustrates the processing of a calculate atmospheric parameters component of the first phase in some embodiments.

FIG. 10 is a flow diagram that illustrates the processing of the calculate atmospheric parameters component of the first phase in some embodiments. The component calculates the atmospheric radiance and transmittance for each band. The component is illustrated as selecting one or more pairs of pixels that are used to calculate the atmospheric parameters for each band. The component could alternatively select different pairs of pixels for each band. In block 1001, the component identifies a first set of pixels around a certain temperature with a relatively low standard deviation for pixels at their temperatures. In block 1002, the component identifies a second set of pixels around another temperature with a relatively low standard deviation for pixels at their temperatures. In block 1003, the component selects a pair of pixels with one pixel from the first set and another pixel from the second set. In decision block 1004, if all the pairs of pixels have already been selected, then the component returns, else the component continues at block 1005. In block 1005, the component selects the next band. In decision block 1006, if all the bands have already been selected, then the component loops to block 1003 to select the next pair of pixels, else the component continue to block 1007. In block 1007, the component calculates the transmittance for the selected band based on the observed radiance and black body radiance of the pixels of the pair. In block 1008, the component updates a running average of transmittance for the selected band based on the transmittance calculated for the selected pair of pixels. In block 1009, the component calculates an atmospheric radiance for the selected band based on the observed radiance and black body radiance for one of the pixels of the pair and the calculated transmittance. In block 1010, the component updates a running average of the atmospheric transmittance for the selected band based on the atmospheric transmittance calculated for the selected pair of pixels. The component then loops to block 1005 to select the next band.

Figure 11:
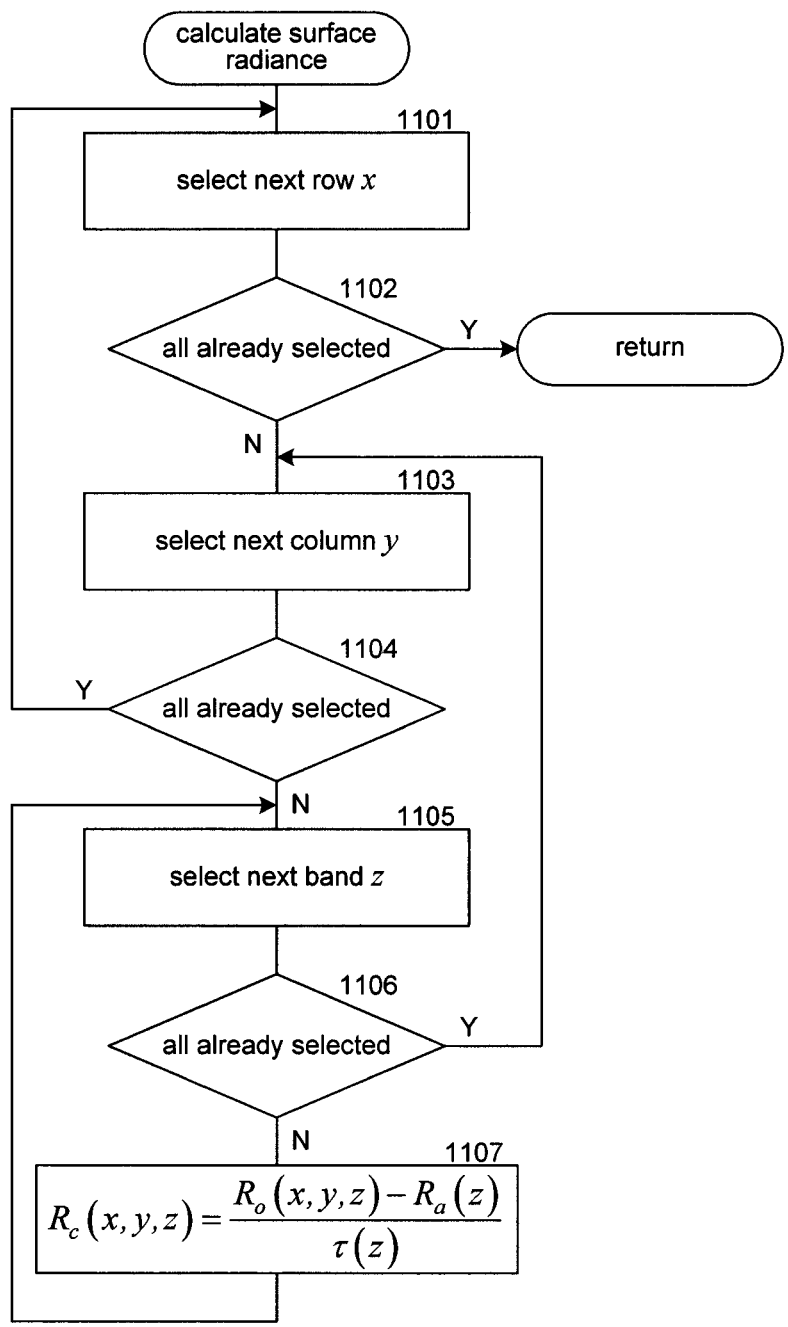
FIG. 11 is a flow diagram that illustrates the processing of a calculate surface radiance component of the first phase in some embodiments.

FIG. 11 is a flow diagram that illustrates the processing of the calculate surface radiance component of the first phase in some embodiments. In blocks 1101-1107, the component loops selecting each pixel of the multispectral image and for each band of each pixel calculates the surface radiance. In block 1101, the component selects the next row of the image. In decision block 1102, if all the rows have already been selected, then all the pixels have been processed and the component returns, else the component continues at block 1103. In block 803, the component selects the next column of the image in order to select the pixel of the selected row and column. In decision block 1104, if all the columns have already been selected, then all the pixels of the selected row have been selected and the component loops to block 1101 to select the next row, else the component continues at block 1105. In block 1105, the component selects the next band for the selected pixel. In decision block 1106, if all the bands have already been selected, then the component loops to block 1103 to select the next pixel in the next column, else the component continues at block 1107. In block 1107, the component calculates the surface radiance for the selected pixel at the selected band using the observed radiance for the selected pixel at the selected band and the calculated atmospheric radiance and transmittance for the selected band and then loops to block 1105 to select the next band.

Figure 12:
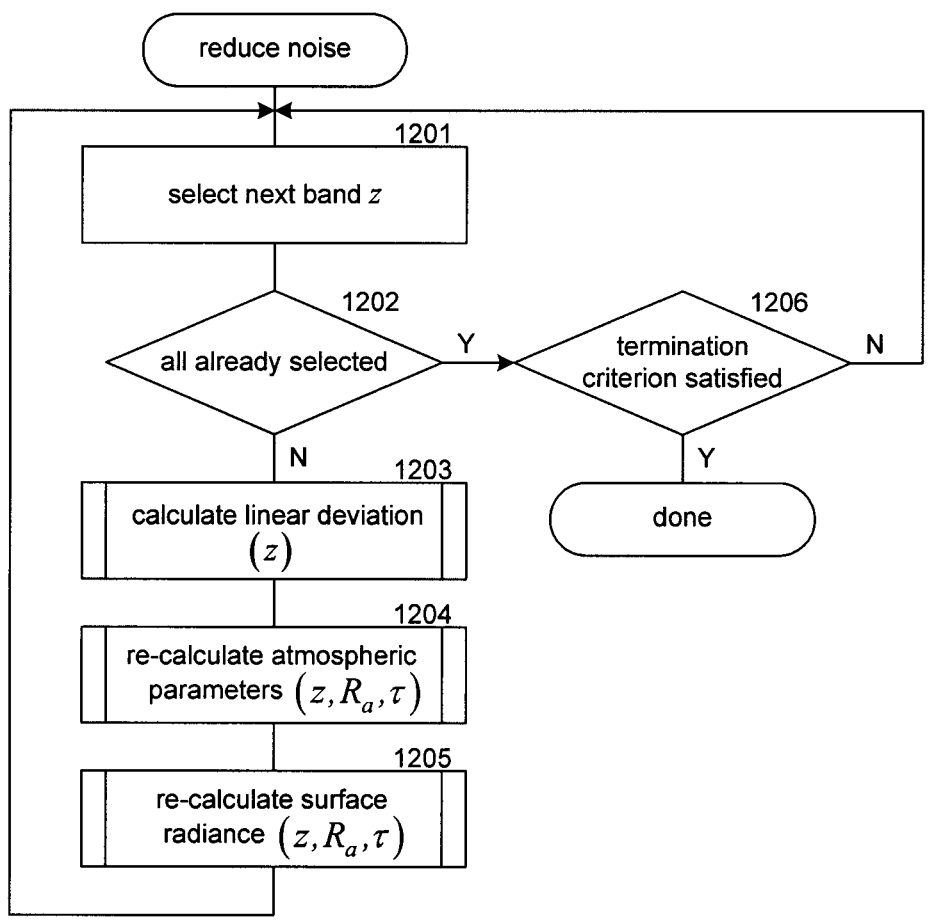
FIG. 12 is a flow diagram illustrating the processing of a reduce noise component of the second phase in some embodiments.

FIG. 12 is a flow diagram illustrating the processing of the reduce noise component of the second phase in some embodiments. The component is passed a surface multispectral image and an observed multispectral image and reduces the noise within the surface multispectral image. In block 1201, the component selects the next band. In decision block 1202, if all the bands have already been selected, then the component continues at block 1206, else the component continues at block 1203. In block 1203, the component invokes the calculate linear deviation component by passing it an indication of the selected band. In block 1204, the component invokes the recalculate parameters component by passing it an indication of the selected band and receiving a recalculated atmospheric radiance and transmittance in return. In block 1205, the component invokes the recalculate surface radiance component by passing it an indication of the selected band and the atmospheric radiance and transmittance for the selected band. The component then loops to block 1201 to select the next band. In decision block 1206, if a termination criterion has been satisfied, then the component completes, else the component loops to block 1201 to start the next iteration.

Figure 13:
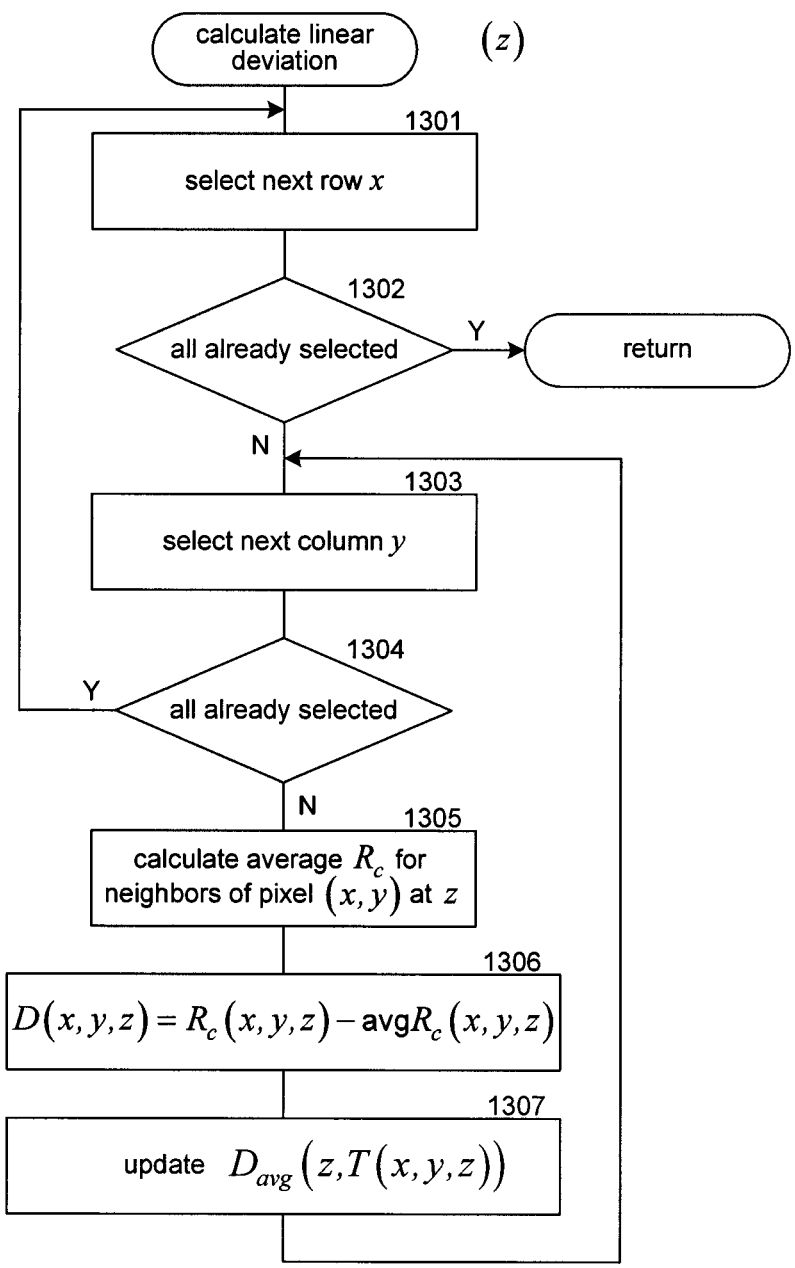
FIG. 13 is a flow diagram that illustrates the processing of a calculate linear deviation component of the second phase in some embodiments.

FIG. 13 is a flow diagram that illustrates the processing of the calculate linear deviation component of the second phase in some embodiments. In block 1301, the component selects the next row of the image. In decision block 1302, if all the rows have already been selected, then the linear deviation for all the pixels have been calculated and the component returns, else the component continues at block 1303. In block 1303, the component selects the next column of the image in order to select the pixel at the selected row and selected column. In decision block 1304, if all the columns have already been selected, then the component loops to block 1301 to select the next row, else the component continues at block 1305. In block 1305, the component calculates the average surface radiance for the neighbors of the selected pixel for the specific band. In block 1306, the component calculates the deviation between the selected pixel and its neighbors. In block 1307, the component updates the running average of deviation for pixels with the same temperature at the specific band. The component then calculates the temperature for each pixel using the surface radiance. The component then loops to block 1303 to select the next column.

Figure 14:
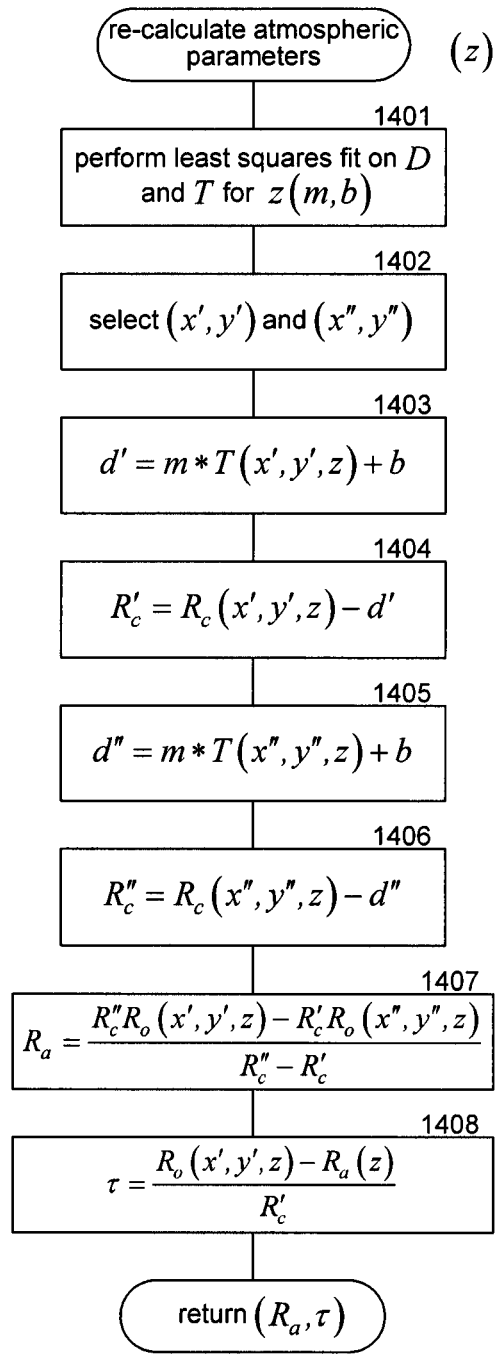
FIG. 14 is a flow diagram that illustrates the processing of a recalculate atmospheric parameters component of the second phase in some embodiments.

FIG. 14 is a flow diagram that illustrates the processing of the recalculate atmospheric parameters component of the second phase in some embodiments. The component is passed an indication of a band and calculates the atmospheric radiance and transmittance for that band. In block 1401, the component performs a least squares fit on a graph of the deviation versus temperature for the selected band that results in a slope and intercept of a smoothed graph. In block 1402, the component selects two pixels with different temperatures. In block 1403, the component calculates the average deviation of the smoothed graph for pixels at the temperature of the first pixel. In block 1404, the component calculates the adjusted surface radiance for the first pixel. In block 1405, the component calculates the average deviation of the smoothed graph for pixels at the temperature of the second pixel. In block 1406, the component calculates the adjusted surface radiance for the second pixel. In block 1407, the component recalculates the atmospheric radiance for the passed band based on the adjusted surface radiance and observed radiance of the pixels. In block 1408, the component recalculates the transmittance for the passed band based on the adjusted surface radiance and observed radiance for one of the pixels and the recalculated atmospheric radiance. The component then returns the recalculated atmospheric radiance and transmittance for the passed band.

Figure 15:
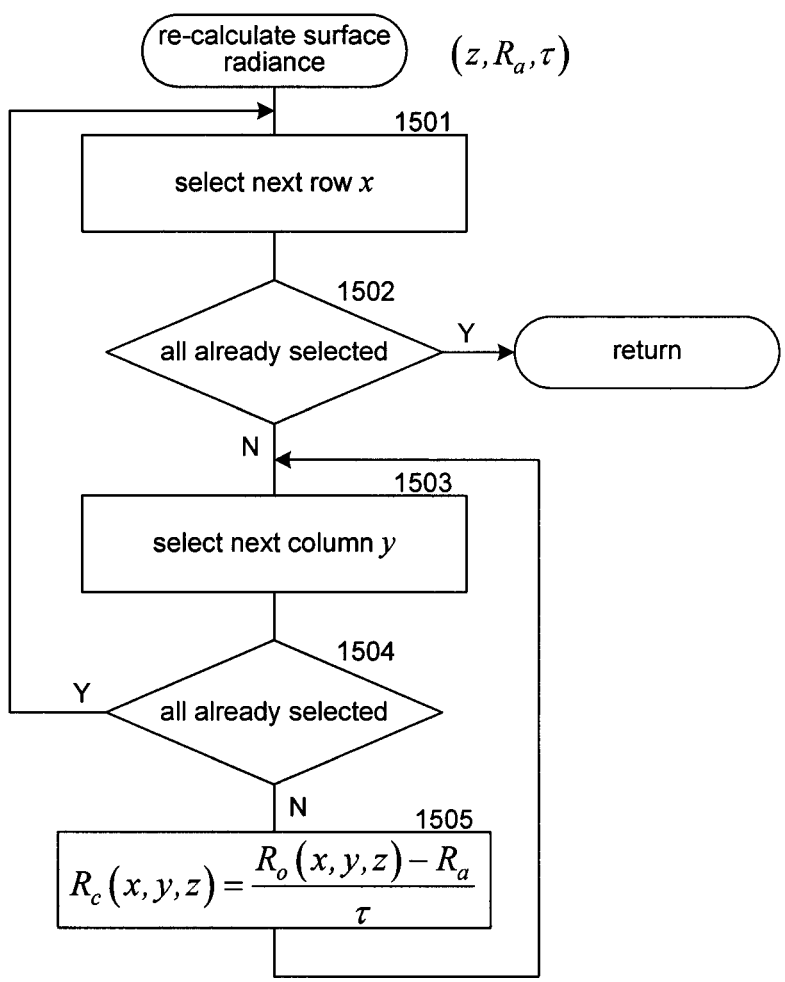
FIG. 15 is a flow diagram that illustrates the processing of a recalculate surface radiance component of the second phase in some embodiments.

FIG. 15 is a flow diagram that illustrates the processing of the recalculate surface radiance component of the second phase in some embodiments. The component is passed an indication of a band and atmospheric radiance and transmission for that band. In block 1501, the component selects the next row of the image. In decision block 1502, if all the rows have already been selected, then all the pixels have been selected and the component returns, else the component continues at block 1503. In block 1503, the component selects the next column of the image in order to select the next pixel. In decision block 1504, if all the columns have already been selected, then the component loops to block 1501 to select the next row, else the component continues at block 1504. In block 1505, the component calculates the surface radiance for the selected pixel of the passed band based on the observed radiance of the selected pixel and the passed atmospheric radiance and transmittance. The component then loops to block 1503 to select the next pixel.

From the foregoing, it will be appreciated that specific embodiments of the invention have been described herein for purposes of illustration but that various modifications may be made without deviating from the scope of the invention. Accordingly, the invention is not limited except as by the appended claims.

I claim:

1. A method performed by a computing device to estimate surface radiance from a multispectral image of a surface, the multispectral image having pixels with an observed radiance for bands of a spectrum, the method comprising:

providing an initial estimate of one or more atmospheric parameters;

for each pixel, calculating a temperature and a black body radiance for each band based on the initial estimate of the one or more atmospheric parameters and the observed radiance of that pixel;

for each pixel, calculating a temperature deviation measuring variability in the temperatures for the bands of that pixel;

for each band,
identifying a first pixel with a low temperature deviation;
identifying a second pixel with a low temperature deviation but with a temperature at that band that is different from the temperature at that band of the first pixel; and
calculating the one or more atmospheric parameters for that band based on the observed radiances and the black body radiances of the first pixel and the second pixel; and for each band of each pixel, calculating a surface radiance for that band of that pixel based on the observed radiance for that band of that pixel and the one or more atmospheric parameters for that band.

2. The method of claim 1 wherein the one or more atmospheric parameters includes atmospheric radiance.

3. The method of claim 1 wherein the one or more atmospheric parameters includes atmospheric transmittance.

4. The method of claim 1 wherein the one or more atmospheric parameters includes atmospheric radiance and transmittance.

5. The method of claim 1 wherein the initial estimate includes an estimate for each band.

6. The method of claim 1 further comprising, for each band, identifying a plurality of pairs with a first pixel and a second pixel; and
for each band, calculating the one or more atmospheric parameters for the band based on the observed radiance and the black body radiance of the first pixel and the second pixel of the pairs.

7. The method of claim 6 wherein the calculating of the one or more atmospheric parameters for the band includes averaging the atmospheric parameters calculated for the pairs for that band.

8. The method of claim 1 wherein the temperature is calculated based on Planck's equation.

9. A computer-readable storage device storing computer-executable instructions for controlling a computing device to derive an atmospheric parameter from a multispectral image of a surface, the multispectral image having pixels with an observed radiance for bands of a spectrum, by a method comprising:

providing an initial estimate of the atmospheric parameter;
identifying at least some pixels of the multispectral image that exhibit black body behavior based on analysis of the observed radiances for the bands of the pixel and the initial estimate of the atmospheric parameter; and
for each band,
selecting a pair of the identified pixels that have a different temperatures; and
calculating the atmospheric parameter for that band based on the observed radiance of the pixels of the pair and the initial atmospheric parameter.

10. The computer-readable storage device of claim 9 wherein the identifying of the at least some pixels that exhibit black body behavior includes:

for pixels of the multispectral image, calculating a temperature for each band of the pixel based on the initial estimate of the atmospheric parameter and the observed radiance of the pixel; and
selecting pixels with a low variability in the temperatures for the spectral bands of that pixel as pixels identified as exhibiting black body behavior.

11. The computer-readable storage device of claim 9 including for each spectral band of each pixel, calculating a surface radiance for that band based on the observed radiance for that band and the atmospheric parameter for that band.

12. The computer-readable storage device of claim 11 further comprising after calculating the surface radiance for a band,
for each pixel, calculating a deviation of the surface radiance at that spectral band for that pixel based on the surface radiance at that band of neighboring pixels in the spectral dimension;
calculating an atmospheric parameter based on a curve fitting of the surface radiance of the pixels of that band for a graph of average deviation versus pixel temperature and based on a pair of pixels whose surface radiance at that band is adjusted by an average deviation given by the curve fitting for that pair of pixels; and
for each pixel, calculating a surface radiance for that pixel based on the observed radiance at that band for that pixel and the atmospheric parameter.

13. The computer-readable storage device of claim 12 wherein calculating the deviation, calculating the atmospheric parameters, and calculating the surface radiance are performed on a band-by-band basis and iteratively until a termination criterion is satisfied.

14. The computer-readable storage device of claim 12 wherein the curve fitting is a least squared curve fitting.

15. The computer-readable storage device of claim 9 wherein for each band a plurality of pairs of identified pixels that have different temperatures at that band are selected and calculating the atmospheric parameter for that band is based on the observed radiances of the plurality of pairs of pixels.

16. A computer-readable storage device storing computer-executable instructions for controlling a computing device to process a surface multispectral image having pixels with a surface radiance for bands of a spectrum, the surface radiance being derived from an observed multispectral image, by a method comprising:

for each pixel, calculating a deviation of the surface radiance for that pixel based on the surface radiance of neighboring pixels;
for each temperature, calculating an average deviation for the pixels with that temperature;
calculating an atmospheric parameter based on a smoothing of the average deviations for each of a range of temperatures and based on adjusting the surface radiance for a pair of pixels using the smoothed average deviations for the temperatures of the pixels; and
for each pixel, calculating the surface radiance for that pixel based on the observed radiance for that pixel and the atmospheric parameter.

17. The computer-readable storage device of claim 16 wherein the atmospheric parameter is selected from a group consisting of atmospheric radiance and transmittance.

18. The computer-readable storage device of claim 16 wherein calculating the deviation, calculating the atmospheric parameter, and calculating the surface radiance are performed iteratively until a termination criterion is satisfied.

19. The computer-readable storage device of claim 16 wherein calculating the deviation, calculating the average deviation, calculating the atmospheric parameter, and calculating the surface radiance are performed on a band-by-band basis.

20. The computer-readable storage device of claim 16 wherein calculating the deviation, calculating the average deviation, calculating the atmospheric parameter, and calculating the surface radiance are performed on a band-by-band basis and iteratively until a termination criterion is satisfied.

* * * * *